United States Patent
Wachsman et al.

(10) Patent No.: US 6,296,687 B2
(45) Date of Patent: *Oct. 2, 2001

(54) HYDROGEN PERMEATION THROUGH MIXED PROTONIC-ELECTRONIC CONDUCTING MATERIALS

(75) Inventors: Eric D. Wachsman, Gainesvillle, FL (US); Naixiong Jiang, Palo Alto, CA (US)

(73) Assignee: Her Majesty the Queen in right of Canada, as represented by the Minister of Natural Resources, Ottawa (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,785

(22) Filed: Apr. 30, 1999

(51) Int. Cl.$^7$ .................................................. B01D 53/22
(52) U.S. Cl. .......................................... 95/55; 96/4; 96/10
(58) Field of Search ................................. 95/55, 56; 96/4, 96/10, 11; 429/33

(56) References Cited

U.S. PATENT DOCUMENTS

| | | | |
|---|---|---|---|
| 4,548,619 | * 10/1985 | Steacy | 95/55 |
| 4,804,448 | 2/1989 | Sammells et al. | 204/243 R |
| 4,981,676 | * 1/1991 | Minet et al. | 423/652 |
| 5,244,753 | 9/1993 | Taniguchi et al. | 429/33 |
| 5,298,235 | 3/1994 | Worrell et al. | 429/33 |
| 5,306,411 | 4/1994 | Mazanec et al. | 204/265 |
| 5,342,431 | * 8/1994 | Anderson et al. | 96/4 X |
| 5,387,330 | * 2/1995 | Taniguchi et al. | 204/421 |
| 5,447,705 | 9/1995 | Petit et al. | |
| 5,478,444 | 12/1995 | Liu et al. | 204/59 R |
| 5,525,322 | 6/1996 | Willms | |
| 5,573,737 | 11/1996 | Balachandran et al. | |
| 5,616,223 | 4/1997 | Shen et al. | 204/295 |
| 5,637,259 | * 6/1997 | Galuszka et al. | 252/373 |
| 5,665,482 | 9/1997 | Mori et al. | 429/33 |
| 5,672,437 | 9/1997 | Yajima | 429/33 |
| 5,702,999 | * 12/1997 | Mazanec et al. | 96/4 X |
| 5,788,748 | 8/1998 | Mazanec et al. | |
| 5,820,654 | * 10/1998 | Gottzman et al. | 96/11 X |
| 5,820,655 | * 10/1998 | Gottzmann et al. | 96/10 X |
| 5,821,185 | 10/1998 | White et al. | |

* cited by examiner

Primary Examiner—Robert H. Spitzer
(74) Attorney, Agent, or Firm—Cooper & Dunham LLP

(57) ABSTRACT

An ionic conductor has been developed which exhibits both hydrogen ion conductivity and electronic conductivity. The conductor is a perovskite-type oxide represented by the general formula: $ABO_3$ where A consists of at least one element selected from the group consisting of Ba, Ca, Mg and Sr and B is $Ce_{1-x}M_x$ where M is a multivalent dopant metal, preferably Eu or Tb, and x is greater than 0 and less than 1. It is particularly useful in processes in which hydrogen is separated from a hydrogen-containing gas, e.g. in conversion of natural gas, operation of hydrogen fuel cells, etc.

7 Claims, 4 Drawing Sheets

HYDROGEN PERMEATION THROUGH MIXED PROTONIC-ELECTRONIC CONDUCTING MATERIALS

BACKGROUND OF THE INVENTION

1. Field of the Invention

This invention relates to mixed protonic-electronic conducting material useful as $H_2$ permeation membrane material or electrode material.

2. Prior Art

Compressed natural gas (CNG) is an economically competitive, widely distributed energy and chemical resource. The natural gas is converted to hydrogen more easily and efficiently than are liquid hydrocarbons and is less expensive per mole $H_2$ produced than any other fuel. Systems for the production of hydrogen from natural gas could be enhanced through the use of thermally efficient, compact, catalytic membrane reactors.

Advances in membrane reactor technology allow economic production of high purity hydrogen from natural gas by coupling steam reforming and hydrogen transport in one step. Removal of product hydrogen continuously through the membrane shifts the equilibrium toward increased hydrogen production. Although palladium metal alloy membranes have been available for several decades, they are expensive and require large areas for adequate fluxes in commercial applications.

Recently, a series of perovskite-type oxides (e.g. $BaCe_{1-x}M_xO_3$, where M is a metal dopant) have been shown to have a high proton conductivity at elevated temperature. These mixed ionic conductors are receiving considerable attention because of their numerous applications as electrolytes in fuel cells, hydrogen pumps, electrolyzers, and gas sensors, and are described for instance in Taniguchi et al. U.S. Pat. No. 5,387,330.

With the above perovskite-type oxides protonic conductivities have been measured on the order of $10^{-2}\ \Omega^{-1}cm^{-1}$ at 600° C. This ionic conductivity is comparable to that observed for oxygen-ion conduction in $La_{1-y}Sr_yCo_{1-x}M_xO_3$ perovskite-type oxides. $La_{1-y}Sr_yCo_{1-x}M_xO_3$ oxides are mixed conductors in that they conduct both oxygen ions and electrons, and they have received considerable attention for application as oxygen permeation membranes. Because of their significant electronic conductivity, they have an internal electrical short and $O_2$ will selectively permeate through the material under a differential oxygen partial pressure ($P_{O2}$). The potential permeation flux rates of these materials are extremely high. For example, calculations based on the results of Teraoka et al. "Influence of Constituent Metal Cations in Substituted $LaCoO_3$ on Mixed Conductivity and oxygen Permeability," *Solid State Ionics*, 48 (1991) 207–212, show $O_2$ flux rates through a 50-μm-thick membrane of $La_{0.6}Sr_{0.4}Co_{0.8}Cu_{0.2}O_3$ at 600° C. to be 22400 L (STP) $h^{-1} \cdot m^{-2}$ of membrane surface area under a 0.21 atm $P_{O2}$ gradient.

$BaCe_{1-x}M_xO_3$-type protonic conductors have sufficient ionic conductivity to obtain comparable flux rates. However, they have insufficient electronic conductivity. The electronic conductivity is necessary to balance the transport of charge through the material. If comparable electronic conduction could be obtained with the $BaCe_{1-x}M_xO_3$-type protonic conductors, they could be excellent $H_2$ permeation membrane materials, equivalent to palladium alloy films.

A second potential application of solid-state high temperature protonic electrolytes is the production of higher hydrocarbons such as $C_6H_6$ and $C_7H_8$ from $CH_4$:

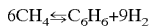

The decomposition and conversion of methane into benzene ($C_6H_6$ and $C_7H_8$) is thermodynamically favoured at moderate temperatures (500° C.) and moderate pressures (1 to 10 atm) when hydrogen is continuously removed to low levels (<0.05 atm). A suitable dehydrogenation catalyst with low coking tendency (Pt or Pd), combined with a small pore zeolite for hydrodecyclization of $C_{2+}$ intermediates (such as $C_2H_4$), could give high yields of aromatics. Electrochemical pumping, by application of a voltage across an $H^+$ electrolyte is essential to increase the rate of $H_2$ removal, since little driving force for H diffusion exists with low $H_2$ partial pressures on both sides of the membrane.

Electrocatalytic conversion of methane to higher hydrocarbons and to syn gas has been reported in the literature. They are described in D.Eng and M. Stoukides, "The Catalytic and Electrocatalytic Coupling of Methane Over Yttria-Stabilized Zirconia," *Catalysis Letters*, 9 (1991) 47–54 and U. Balachandran et al., "Fabrication of Ceramic-Membrane Tubes for Direct Conversion of Natural Gas," Paper presented at the 1992 International Gas Research Conference. Both of these approaches used solid, oxygen-ion conducting ceramics. Under these conditions, both approaches are partial oxidation routes. At high conversions, partial oxidation runs the risk of producing undesirable, deep oxidation products ($CO_2$ and $H_2O$), thus limiting $H_2$ yield. A preferable route is to electrocatalytically abstract an H from $CH_4$ by using a protonic conductor. The resulting $CH_3$ fragments then form higher hydrocarbons in the reacting gas stream, and pure $H_2$ is produced on the other side of the membrane.

For both of these applications, mixed protonic-electronic conducting materials are required. For electrocatalytic conversion the mixed conducting material is necessary for the electrodes, and for $H_2$ permeation membranes it is the membrane material itself.

Galuszka et al. U.S. Pat. No. 5,637,259 describes a process for producing syn gas and hydrogen from natural gas using a membrane reactor. This used a hydrogen permeable membrane wall in the form of a porous alumina tube having a palladium film superimposed on the inner wall thereof.

A process for steam reforming of a hydrocarbon to produce $H_2$, Co and $CO_2$ is described in Minet et al. U.S. Pat. No. 4,981,676. That process also utilizes a hydrogen permeable membrane wall for separating hydrogen from the reaction zone.

It is an object of the present invention to provide a process for separating hydrogen from a hydrogen-containing gas by means of a membrane formed of a material that is both hydrogen ion conductive and electronic conductive.

SUMMARY OF THE INVENTION

The present invention in its broadest aspect relates to mixed protonic-electronic conducting materials that have been synthesized from $BaCe_{1-x}M_xO_3$-type protonic conductors. Thus, it was found that by judicious substitution of multivalent transition metal and lanthanide cations (M), electronic conduction in $BaCe_{1-x}M_xO_3$ could become appreciable and the resultant $H_2$ be comparable to the $O_2$ flux of $La_{1-y}Sr_yCo_{1-x}M_xO_3$.

In particular, it was found that excellent results were obtained with perovskite-type oxides of the formula $BaCe_{1-x}M_xO_3$ where M is a multivalent dopant metal. Particularly preferred multivalent metals for this purpose are $Eu^{3+/+2}$ and $Tb^{3+/+2}$. Other multivalent metals that may be used include Lanthanides such as $Pr^{+4/+3}$, $Sm^{+3/+2}$, $Tm^{+3/+2}$, $Yb^{+3/+2}$, and Transition metals such as $Ti^{+4/+3}$, $V^{+4/+3}$, $Cr^{+3/+2}$, $Mn^{+4/+3/+2}$, $Fe^{+3/+2}$, $Co^{+3/+2}$, $Ni^{+/+2}$, $Mo^{+4/+3}$, $W^{+4/+3/+2}$. The Gd doped compound has been known to have the highest ionic conductivity in this class of materials and Eu and Tb were found to have the appropriate ionic radii to substitute for Gd. This is important in being able to synthesize a single-phase compound and because the ionic conductivity is dependent on the cation radius with a maximum near that of Gd.

Thus, the mixed protonic-electronic conducting material of the present invention comprises a perovskite-type oxide represented by the general formula:

$$ABO_3$$

where A consists of at least one element selected from the group consisting of Ba, Ca, Mg and Sr and B is $Ce_{1-x}M_x$ where M is a multivalent dopant metal, preferably, Eu or Tb, and x is greater than 0 and less than 1. Preferred compounds are those where x is between 0.05 and 0.40.

The invention also relates to a process for hydrogen separation from a hydrogen-containing gas comprising contacting a first side of a gas impermeable mixed hydrogen ion and electronic conducting membrane with said hydrogen containing gas at an elevated pressure concurrently with contacting a second opposite side of said membrane with gas at a lower pressure than said hydrogen containing gas and withdrawing hydrogen ions from said second opposite side of said membrane, said mixed hydrogen ion and electronic conducting membrane comprising a perovskite-type oxide represented by the general formula:

$$ABO_3$$

where A consists of at least one element selected from the group consisting of Ba, Ca, Mg and Sr and B is $Ce_{1-x}M_x$ where M is multivalent dopant metal, preferably Eu or Tb, and x is greater than 0 and less than 1.

The hydrogen separation process may comprise a variety of processes, such as reforming light hydrocarbons to produce synthesis gas (CO and $H_2$), separating $H_2$ from synthesis gas, converting natural gas ($CH_4$) to $H_2$ and higher hydrocarbons, such as benzene, operation of a hydrogen fuel cell, etc.

BRIEF DESCRIPTION OF THE DRAWINGS

These and other objects and features of the present invention will become clear from the following description taken in conjunction with the preferred embodiments thereof with reference to the accompanying drawings, in which.

DESCRIPTION OF THE PREFERRED EMBODIMENTS

Figure 1:
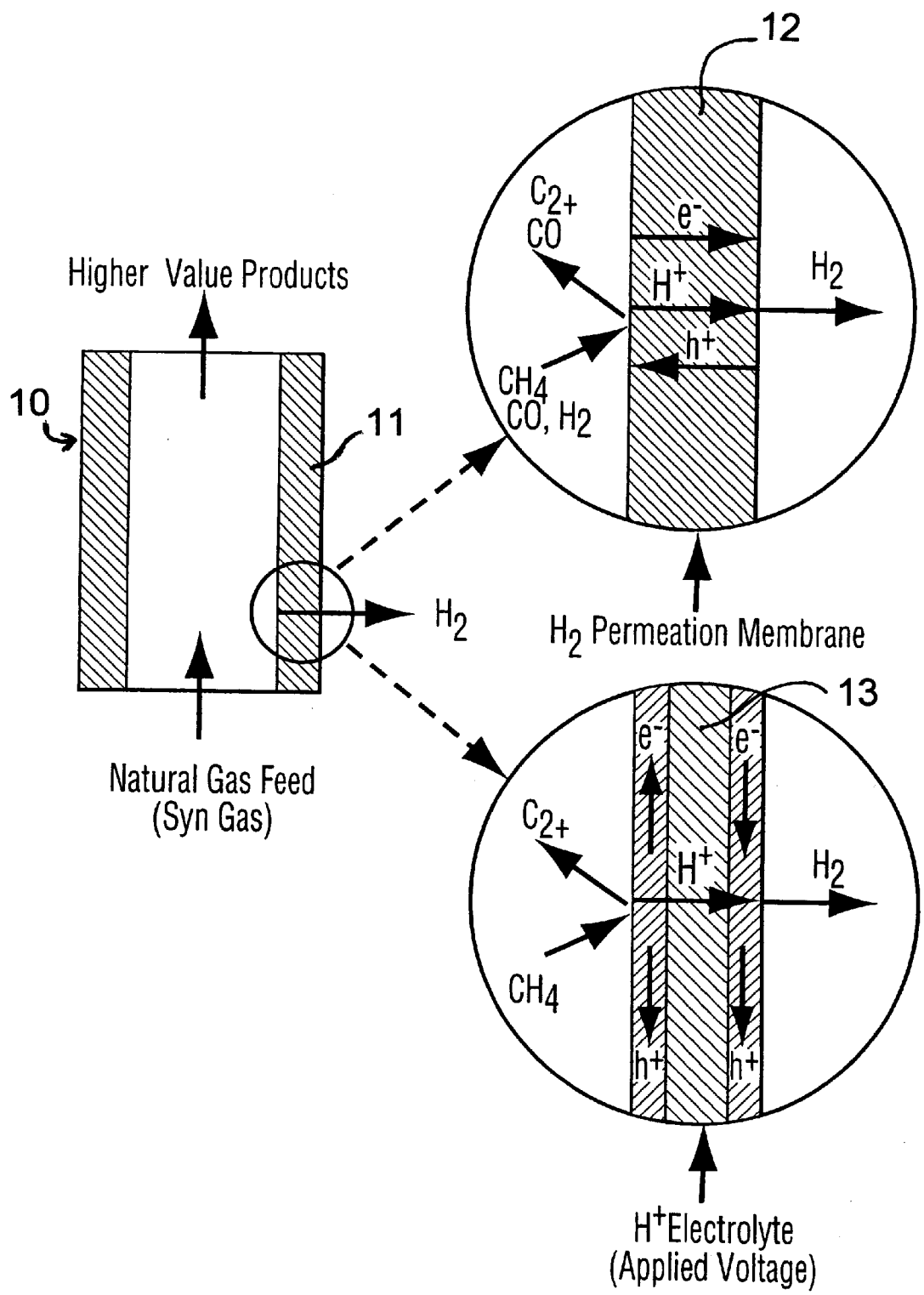
FIG. 1 is a schematic illustration of the hydrogen permeation according to the invention.

FIG. 1 shows conceptually how $H_2$ permeation takes place according to the invention. This shows a membrane reactor 10 in which the wall 11 is formed of the material of this invention. The wall 11 may be either a $H_2$ permeation membrane 12 or an electrode 13.

Natural gas or synthesis gas is fed through the reactor 10. The natural gas is converted to $H_2$ and $C_{2+}$, with in situ $H_2$ separation by way of the electrode 13 or $H_2$ is separated from the syn gas by means of the $H_2$ permeation membrane 12.

EXAMPLE 1

Figure 2:
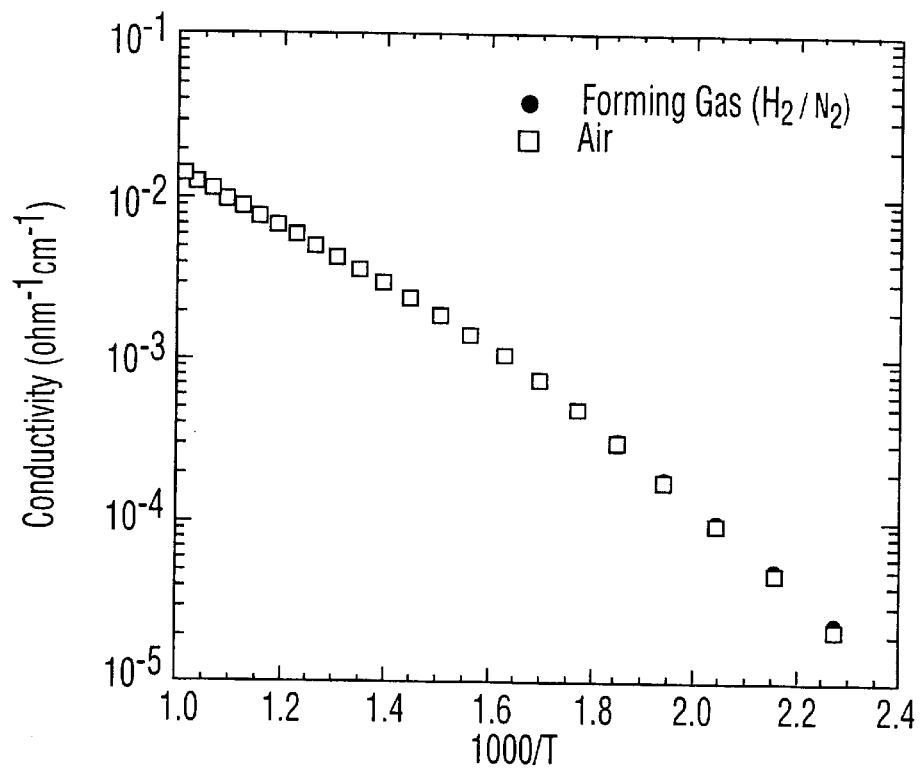
FIG. 2 is a graph showing the differences in conductivity between $H_2$ and $O_2$ environments, for $BaCe_{0.85}Gd_{0.15}O_3$.
Figure 3:
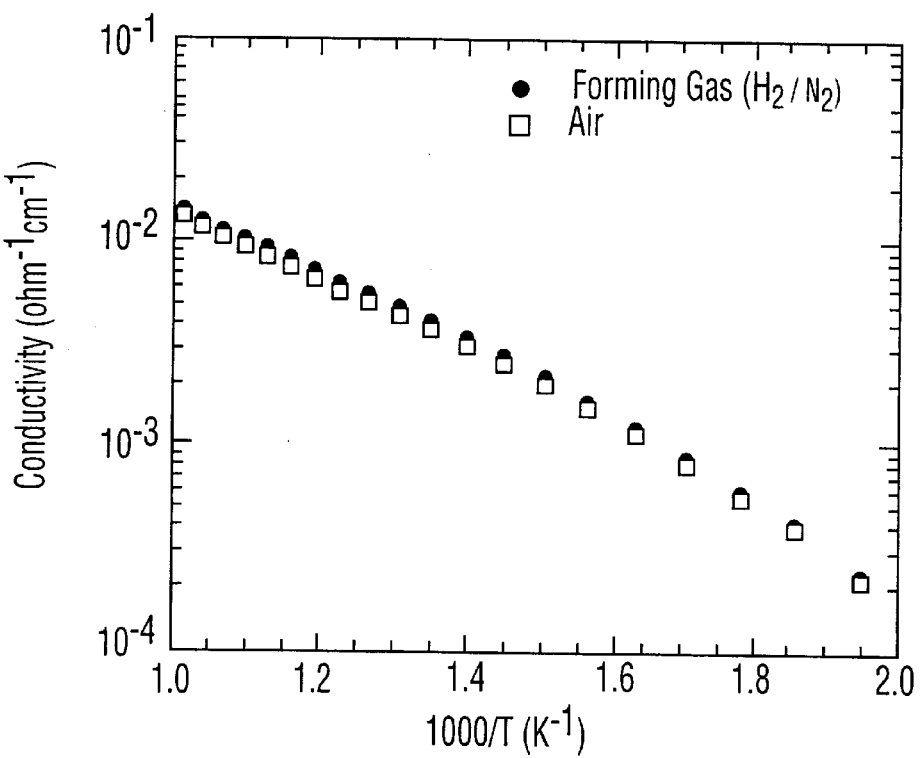
FIG. 3 is a graph showing the differences in conductivity between $H_2$ and $O_2$ environments, for $BaCe_{0.85}Eu_{0.15}O_3$.
Figure 4:
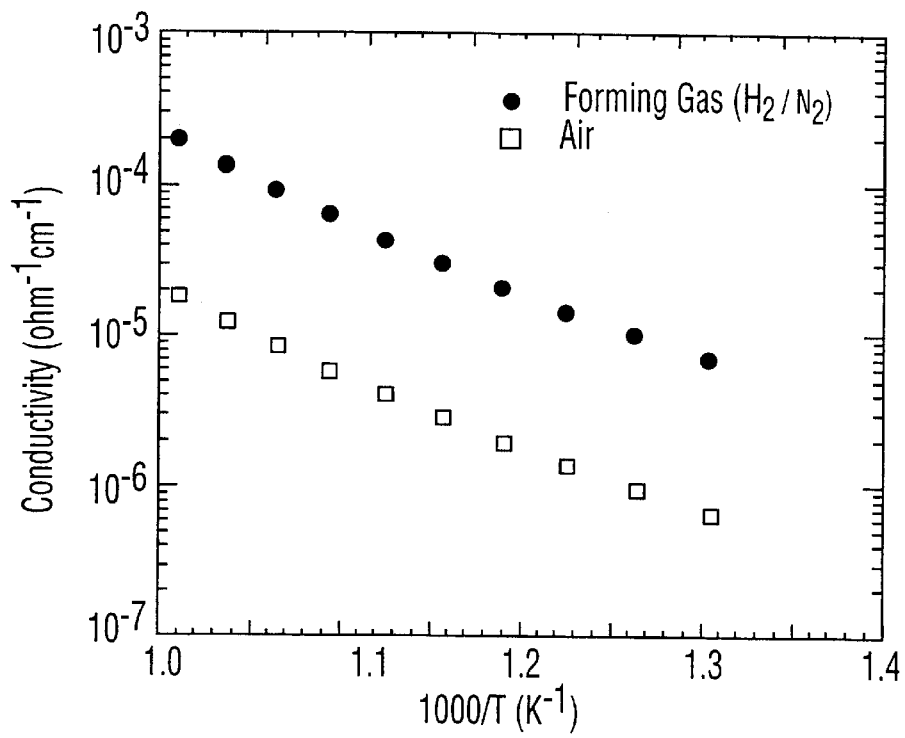
FIG. 4 is a graph showing the differences in conductivity between $H_2$ and $O_2$ environments for $BaCe_{0.85}Tb_{0.15}O_3$.

A series of single-phase compounds were successfully synthesized using Gd, Eu and Tb as dopants. The conductivities of $BaCe_{0.85}Gd_{0.15}O_3$, $BaCe_{0.85}Eu_{0.15}O_3$, and $BaCe_{0.85}Tb_{0.15}O_3$ were measured using AC impedance spectroscopy, from 175° C. to 725° C. in a $H_2/N_2$ atmosphere (forming gas) and air. For $BaCe_{0.85}Gd_{0.15}O_3$ (FIG. 2) the conductivities were consistent with previously known results, and since electronic conductivity is negligible there was no apparent difference in conductivity between the $H_2$ and $O_2$ environments. In contrast, the difference in conductivity between $H_2$ and $O_2$ environments is apparent for  $BaCe_{0.85}Eu_{0.15}O_3$ (FIG. 3) and dramatic for $BaCe_{0.85}Tb_{0.15}O_3$ (FIG. 4). This difference in conductivity between oxidizing and reducing environments is indicative of the electronic character desired according to the invention. While the Tb substituted material exhibits the greatest effect of gaseous environment on conductivity, it also has the lowest overall conductivity.

Figure 5:
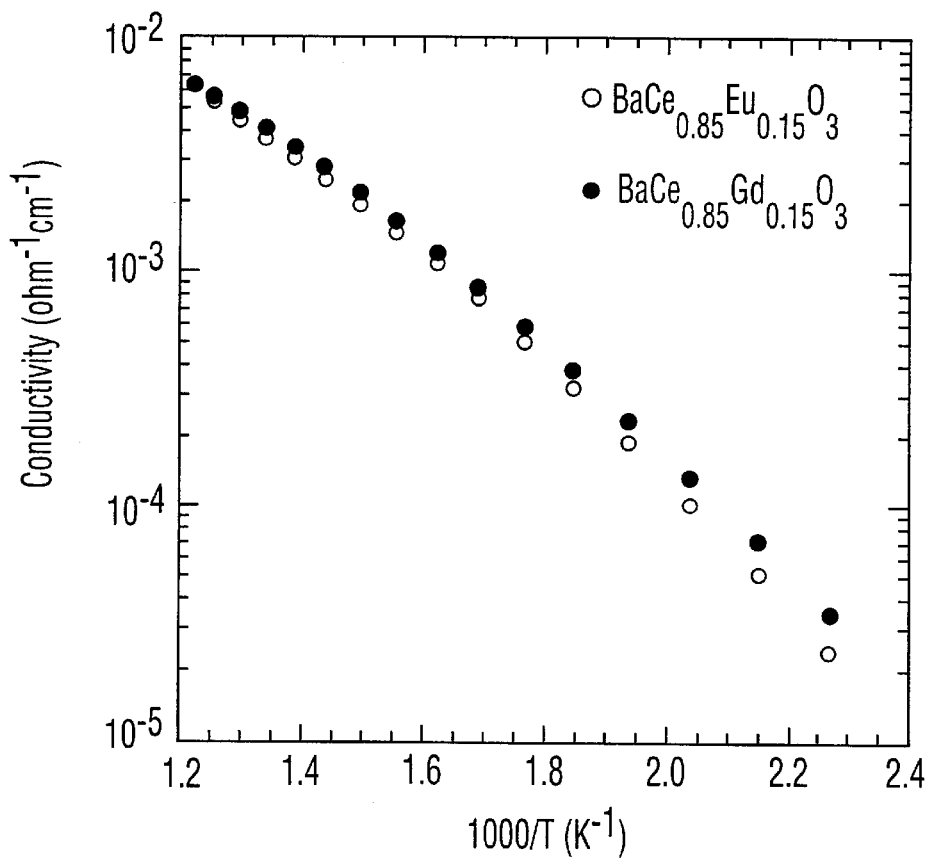
FIG. 5 is a graph showing comparative conductivities for different materials in an $H_2$ environment.

A comparison of the conductivities of $BaCe_{0.85}Gd_{0.15}O_3$ and $BaCe_{0.84}Eu_{0.15}O_3$ in an $H_2$ environment is shown in FIG. 5. The Eu doped compound exhibits greater conductivity than the Gd compound. At the lower temperatures, the conductivity of $BaCe_{0.85}Eu_{0.15}O_3$ is greater than that of $BaCe_{0.85}Gd_{0.15}O_3$ by almost a factor of 2. Therefore, this new compound has the highest conductivity of any protonic conductor in this class of materials.

EXAMPLE 2

A series of permeation tests were conducted to determine the hydrogen permeability of the products of the invention. The base materials for the permeation samples were synthesized from $BaCO_3$ and $Eu_2O_3$ or $Gd_2O_3$ (Alfa Aesar) and $CeO_2$ (Nippon Yttrium). Powders were made from these samples containing 15 mol % Eu and 15 mol % Gd  ($BaCe_{0.85}Eu_{0.15}O_3$ and $BaCe_{0.85}Gd_{0.15}O_3$). The powder was ball milled with zirconia media in acetone for 10 hours and then the dried powder was calcined at 1350° C. for 10 hours. X-ray diffraction showed these powders to be singlephase. The samples were pressed in a 2.86 cm die and sintered at 1550° C. for 10 hours, then carefully polished to a thickness of about 2 mm with 240, 320, and 600 grit SiC paper. The density of the samples was determined to be 5.7 g/cc corresponding to 89% of theoretical density.

The 2 mm thick $BaCe_{0.85}Eu_{0.15}O_3$ and $BaCe_{0.85}Gd_{0.15}O_3$ ceramic discs were tested for hydrogen permeation. The discs were sealed between two glass O-rings. The average inner and outer diameters of the O-rings were 2.38 and 2.54 cm respectively, leaving an effective permeation area ~2.2 cm². The furnace was initially ramped to 950° C., held for 10 hours and then cooled to 700° C. at 3° C./min with a He flow on the sweep side so that the status of the glass seals could be measured as a function of time. In this configuration, an $H_2$—$N_2$ (4%–96%) mixture was fed through the fuel side tubing at 30 $cm^3$/min while on the sweep side He was flowed at a similar rate. The gas effluent in the He sweep was analyzed using an on-line mass spectrometer. The flux was determined as a function of time and temperature from the $H_2$ partial pressure in the sweep gas, the He flow-rate, and the effective permeation area, assuming the ideal gas law.

The $H_2$ permeation flux through $BaCe_{0.85}Eu_{0.15}O_3$ was measured while cooling from 700° C. at 3° C./min, with a 30 minute hold at each 50 degree increment to allow for standardization of the flux. The $H_2$ permeation flux as a function of temperature is plotted in FIG. 6. The maximum flux measured, at about 600° C., is about 0.42 $cm^3$/min $cm^2$.

Figure 6:
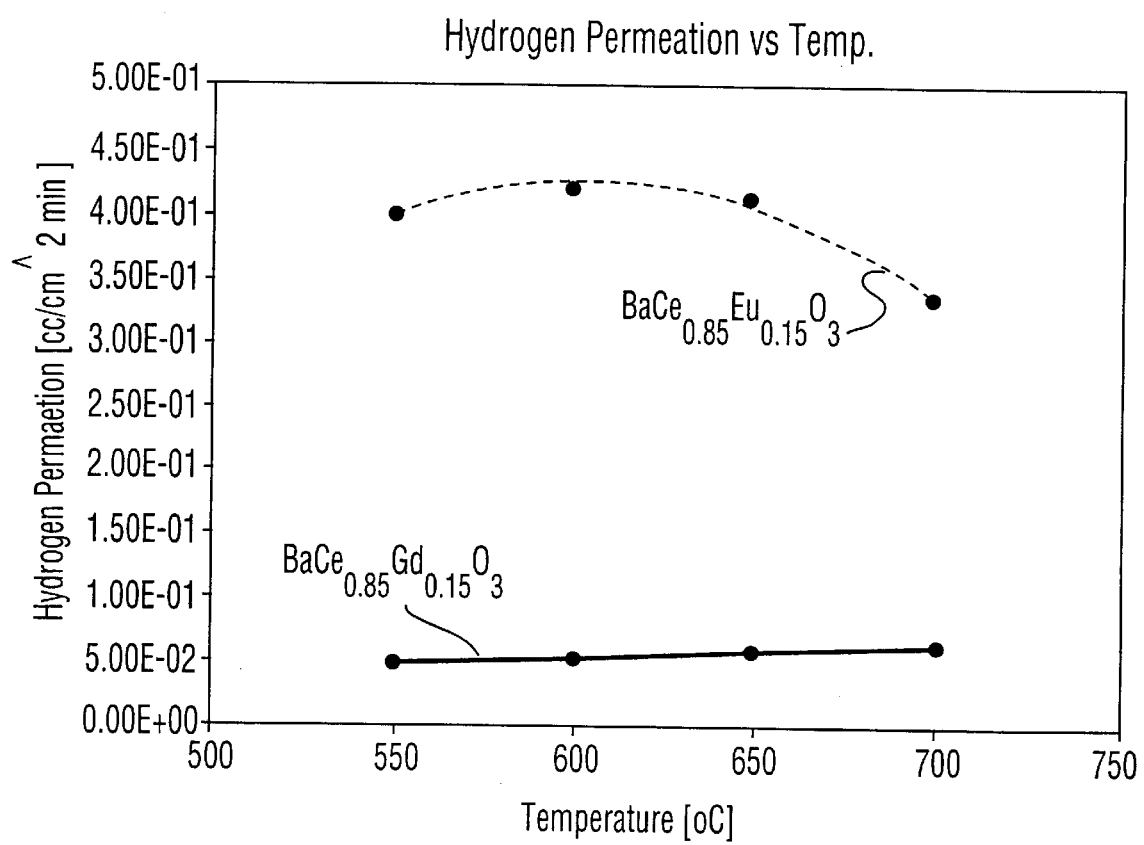
FIG. 6 is a graph showing $H_2$ permeation through a membrane of the invention as a function of temperature for $BaCe_{0.85}Eu_{0.15}O_3$ and $BaCe_{0.85}Gd_{0.15}O_3$.

A corresponding $H_2$ permeation flux as a function of temperature was also obtained for $BaCe_{0.85}Gd_{0.15}O_3$ and plotted in FIG. 6. It provided a maximum flux of only about 0.05 $cm^3$/min $cm^2$ due to lack of electronic conductivity.

EXAMPLE 3

Using the same general procedure as in Example 2, a series of further oxides of the invention were synthesized having the compositions $BaCe_{0.95}Eu_{0.05}O_3$, $BaCe_{0.90}Eu_{0.10}O_3$, $BaCe_{0.85}Eu_{0.15}O_3$, $BaCe_{0.80}Eu_{0.20}O_3$, $BaCe_{0.75}Eu_{0.25}O_3$, $BaCe_{0.85}Eu_{0.15}O_3$. The powders obtained were characterized by x-ray diffraction and all were found to be single-phase perovskite, consistent with the $BaCeO_3$ structure.

Although the present invention has been fully described in connection with the preferred embodiments thereof, it is to be noted that various changes and modifications are apparent to those skilled in the art. Such changes and modifications are to be understood as included within the scope of the present invention as defined by the appended claims.

What is claimed is:

1. A process for hydrogen separation from a hydrogen-containing gas comprising contacting a first side of a gas impermeable mixed hydrogen ion and electronic conducting membrane with said hydrogen containing gas at an elevated pressure concurrently with contacting a second opposite side of said membrane with gas at a lower pressure than said hydrogen containing gas and withdrawing hydrogen ions emerging from said second opposite side of said membrane, said mixed hydrogen ion and electronic conducting membrane comprising a perovskite oxide represented by the general formula:

$$ABO_3$$

where A consists of at least one element selected from the group consisting of Ba, Ca, Mg and Sr and B is $Ce_{1-x}M_x$ where M is a multivalent dopant metal selected from the group consisting of Eu and Tb and x has a value between 0.05 and 0.40.

2. The process according tn claim 1 wherein M is Eu.

3. The process according to claim 1 which comprises reforming light hydrocarbon to produce synthesis gas with separation of hydrogen.

4. The process according to claim 1 which comprises converting natural gas to $H_2$ and higher hydrocarbons with separation of hydrogen.

5. A process for hydrogen separation from a hydrogen-containing gas comprising contacting a first side of a gas impermeable mixed hydrogen ion and electronic conducting membrane with said hydrogen containing gas at an elevated pressure concurrently with contacting a second opposite side of said membrane with gas at a lower pressure than said hydrogen containing gas and withdrawing hydrogen ions emerging from said second opposite side of said membrane, said mixed hydrogen ion and electronic conducting membrane comprising a perovskite oxide represented by the general formula:

$$BaCe_{1-x}Eu_xO_3$$

where x has a value between 0.05 and 0.40.

6. The process according to claim 5 wherein x has a value between 0.05 and 0.20.

7. The process according to claim 5 wherein x has the value of 0.15.

* * * * *